(12) United States Patent
Cuylen et al.

(10) Patent No.: US 7,443,877 B2
(45) Date of Patent: Oct. 28, 2008

(54) METHOD FOR CODING A SEQUENCE OF DATA BITS, IN PARTICULAR FOR TRANSMISSION VIA AN AIR INTERFACE

(75) Inventors: Michael Cuylen, Zirndorf (DE); Dieter Horst, Cadolzburg (DE)

(73) Assignee: Siemens Aktiengesellschaft, Munich (DE)

( * ) Notice: Subject to any disclaimer, the term of this patent is extended or adjusted under 35 U.S.C. 154(b) by 843 days.

(21) Appl. No.: 10/928,262

(22) Filed: Aug. 30, 2004

(65) Prior Publication Data

US 2005/0111473 A1    May 26, 2005

Related U.S. Application Data

(63) Continuation of application No. PCT/DE03/00480, filed on Feb. 17, 2003.

(30) Foreign Application Priority Data

Feb. 28, 2002   (DE) ................. 102 08 731

(51) Int. Cl.
*H04L 12/43* (2006.01)
*H03M 7/38* (2006.01)
*H03M 5/00* (2006.01)

(52) U.S. Cl. ..................... 370/458; 341/51; 341/55
(58) Field of Classification Search .......... 370/445, 370/447, 458, 461; 341/50–52, 55, 59, 64, 341/68–72

See application file for complete search history.

(56) References Cited

U.S. PATENT DOCUMENTS 4,471,345 A   9/1984   Barrett, Jr.

(Continued)

FOREIGN PATENT DOCUMENTS

DE   33 05 685 A1   9/1983

(Continued)

OTHER PUBLICATIONS

"Quick Bit Error Rate Estimator for Infrared Data Association", IBM Technical Disclosure Bulletin, Dec. 1, 1996, pp. 61-63, vol. 39, No. 12, IBM Corp., NY US.

(Continued)

*Primary Examiner*—Aung S. Moe
*Assistant Examiner*—Kerri M Rose
(74) *Attorney, Agent, or Firm*—Sughrue Mion, PLLC

(57) ABSTRACT

A method for coding a sequence of data bits (B1-B5), at least one of said bits having a logical on value or a logical off value. The data bits are organized in a sequence of time slot frames (Fr1-FR5). At least one time slot frame has a plurality of time slots (ZS11-ZS13). Each of the plurality of times slots are capable of having an on value or an off value (Z1 or Z0). The coding comprises preloading a time slot (ZS14, AF) from the plurality of time slots with an off value (Z0). Each of the time slots (ZS11-ZS13) other than the preloaded time slot (ZS14) are loaded with an on value or an off value to form a logical on value or logical off value for the at least one of said data bits. A time slot with an off value from the plurality of time slots always follows another time slot with an on value from the plurality of time slots. The logical on value is complementary to the logical off value.

23 Claims, 2 Drawing Sheets

U.S. PATENT DOCUMENTS 6,833,798 B2 * 12/2004 Cuylen .................. 341/52

FOREIGN PATENT DOCUMENTS

| DE | 196 20 137 A1 | 11/1997 |
| DE | 199 10 875 A1 | 9/2000 |

OTHER PUBLICATIONS

Klaus Finkenzeller, "RFID Handbuch" [RFID Manual], 3rd Edition, Carl Hanser Verlag, Munich 2002 pp. 190-191.

Identification cards—Contactless integrated circuit(s) cards—Vicinity Cards—Part 2: Air interface and initialization. ISO/IEC FDIS 15693-2: 2000, ISO, Geneva, pp. i-v and 1-13.

Identification cards—Contactless integrated circuit(s) cards—Proximity cards—Part 2: Radio frequency power and signal interface, ISO/IEC FDIS 14443-2: 2000, ISO, Geneva, pp. i-v and 1-11.

* cited by examiner

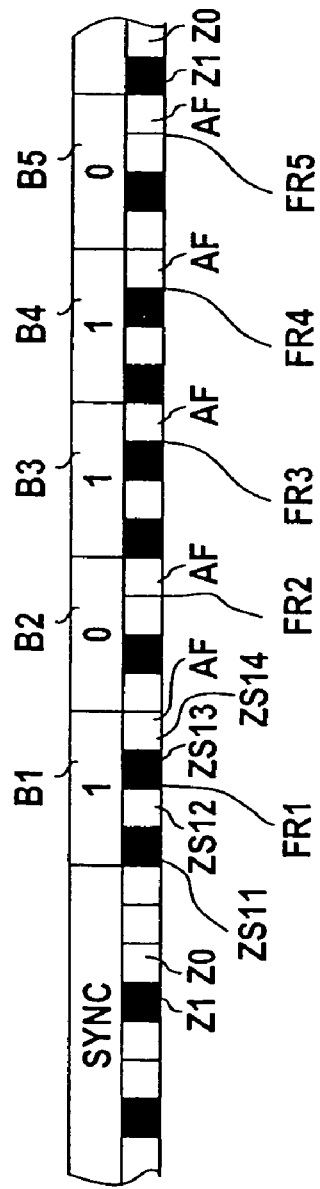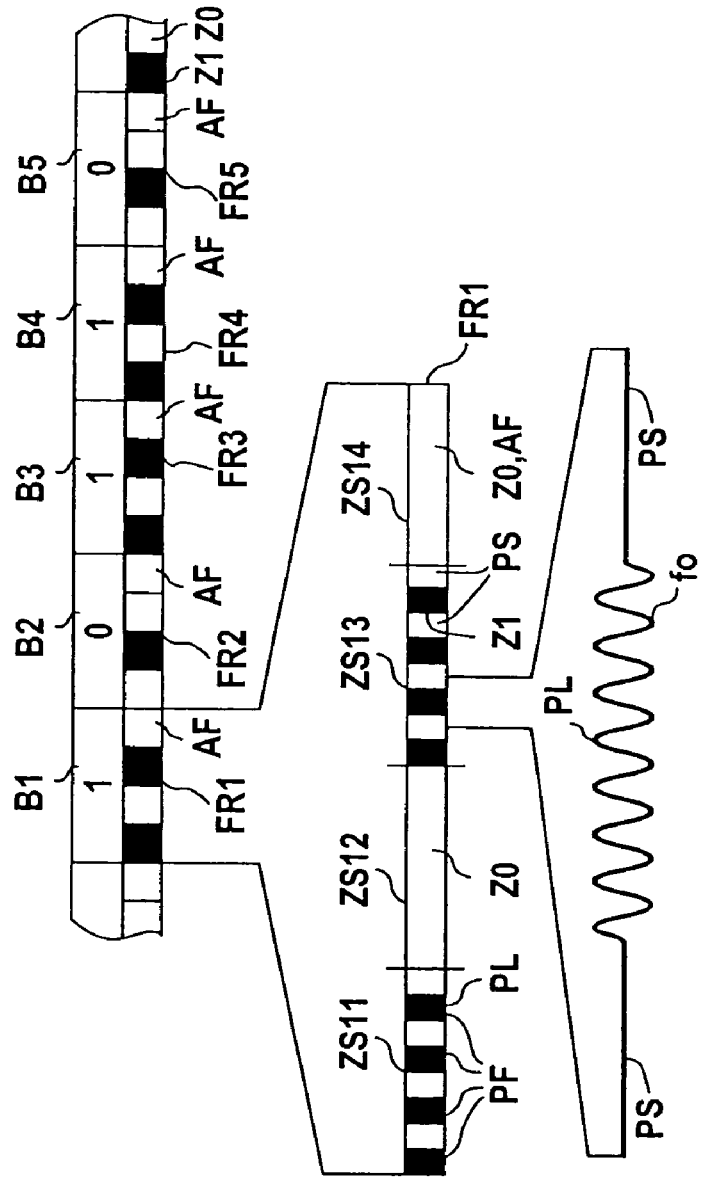
FIG 2
FIG 4

US 7,443,877 B2

METHOD FOR CODING A SEQUENCE OF DATA BITS, IN PARTICULAR FOR TRANSMISSION VIA AN AIR INTERFACE

This is a Continuation of International Application PCT/DE03/00480, with an international filing date of Feb. 17, 2003, which was published under PCT Article 21(2) in German, and the disclosure of which is incorporated into this application by reference.

FIELD OF INVENTION

The invention relates to a method for coding a sequence of data bits which have a logical on or off value.

A continuity monitoring system which operates using coded identification marks is known from U.S. Pat. No. 4,471,345. An associated monitoring station has means for transmission of a checking signal with a specific code pattern.

A system in which a test sequence is coded on the basis of return-to-zero modulation is known from the document "QUICK BIT ERROR RATE ESTIMATOR FOR INFRA-RED DATA ASSOCIATION" IBM TECHNICAL DISCLOSURE BULLETIN, IBM CORP. NEW YORK, US, Vol. 39, No. 12, Dec. 1, 1996 (Dec. 1, 1996), pages 61-63, XP000686019 ISSN: 0018-8689.

Signal codings in baseband, which are normally used for RFID systems, for example NRZ, Manchester and Unipolar RZ coding, are described on pages 190 and 191 of the textbook by Klaus Finkenzeller titled "RFID Handbuch" [RFID Manual], 3rd Edition, Carl Hanser Verlag, Munich 2002.

Non-contacting identification systems operate using non-contacting transmission techniques. Such a non-contact transmission can be achieved electromagnetically, by means of light, infrared or ultrasound. Non-contacting identification systems are used, for example, for identifying people or for identifying moving goods like vehicles. The necessary data is transmitted from a transmitter/receiver via a non-contacting data transmission path. For example, data could be transmitted via an air interface to a mobile data memory, and back. Using such non-contacting identification techniques data can also be recoded onto a mobile data memory, as it moves, without the need for the mobile data memory to be inserted into or passed through a reader/writer.

In order to allow the mobile data memories to be used without any time restrictions they do not contain any chemical energy storage devices like batteries. In such cases, the required electrical energy is drawn in a non-contacting manner externally. For example, such devices draw electrical energy from an electrical or magnetic field originating from the transmitter/receiver. Suitable transmission and coding methods are therefore required for communication between the transmitter/receiver and the mobile data memories.

Only specific frequency bands are, in general, allowed for transmission of data. For example, the ISM frequency bands (industrial, scientific and medical) are used for industrial, scientific and medical applications. In this case, the specified maximum permissible field strength for each frequency range allows only a maximum data rate. In addition to transmitting data, the transmission and coding techniques must also ensure that the electronics in the mobile data memory are supplied with energy.

Techniques used for transmission and coding also allow continuous supply of energy to the data memory electronics. In such techniques, the carrier frequency which is modulated with the data to be transmitted is switched off for a predetermined maximum time interval for energy transmission. Within this time interval, an energy store which has previously been charged in the mobile data memory is replenished.

Data is transmitted from the mobile data memory to the reader/writer by means of load modulation. In this technique, the mobile data memory attenuates the inducing magnetic field in a time slot pattern. In accordance with the standards mentioned above, load modulation may be carried out continuously or with carrier-frequency modulation for one time slot, depending on the chosen type of transmission.

Methods such as these are known, for example, from the ISO/IEC Standard 15693 Part 2 "Air Interface and Initialization", or from the Standard 14443 for operation in an ISM frequency band.

When the reader/writer sends a transmission request to a mobile data memory, it is possible that two or more mobile data memories with identical synchronization sequences transmit signals with different subsequent data. The reader/writer detects this collision using an accompanying plausibility check. However, the collision is detected after receiving two successive modulated time slots. The reader/writer then waits for the ongoing data transmission sequence, so that collision information can then be sent to the mobile data memories. Depending on the data protocol being used, the data transmission sequence may comprise from one byte to several kilobytes. Subsequently, the collision can be resolved by the mobile data memories by means of known collision resolution mechanisms.

Such a technique has the disadvantage that the system needs to wait for completion of an ongoing data transmission sequence before, for example, a termination command or collision information can be sent to the mobile data memories involved. However, it is possible that that the mobile data memories are present in the reception areas only for a short time. The available time may be insufficient for collision resolution and for subsequent data transmission between the reader/writer and the individual mobile data memories.

OBJECTS OF THE INVENTION

An object of the invention is to propose a new coding method, which allows faster detection of a collision, and faster termination of data transmission, for a renewed check. Another object of the invention is to provide a mobile data memory, a reader/writer, as well as an identification system based on the disclosed techniques.

SUMMARY OF THE INVENTION

At least some of the disadvantages of the conventional art are overcome by a method for coding a sequence of data bits, at least one of said bits having a logical on or off value. The data bits are organized in a sequence of time slot frames. At least one time slot frame has a plurality of time slots. Each of the plurality of times slots are capable of having an on value or an off value. The coding comprises preloading a time slot from the plurality of time slots with an off value. Each of the time slots other than the preloaded time slot are loaded with an on value or an off value to form a logical on value or a logical off value for the at least one of said data bits. A time slot with an off value from the plurality of time slots always follows another time slot with an on value from the plurality of time slots. The logical on value is complementary to the logical off value.

According to further enhancements, a preloaded time slot in the method may be arranged at the start or end of a time slot frame. The time slots which are not preloaded can thus be loaded with on or off values in time slot frames, such that the loading with a logical on value is complementary to loading with a logical off value. Furthermore, a time slot frame may have an odd number of time slots which are not loaded, with a greater number of time slots being loaded with an on value, in particular for coding of a logical on value, than for coding of a logical off value. A time slot with an on value can be formed by a pulse sequence, in which case the pulse sequence may, in particular, have an even number of pulses and pauses with the same duty ratio. Furthermore, a number, which can be predetermined, of carrier oscillations may be associated with one pulse.

Another aspect of the invention that achieves some of the noted objects is a mobile data memory for non-contacting interchange of a sequence of data bits with a reader/writer, and having a first coding device that is operable to implement some of the techniques discussed above. The mobile data memory may have a data checker which can terminate the non-contacting interchange of a sequence of data bits on identification of an on value in a preloaded time slot. Furthermore, the mobile data memory can restart the non-contacting data interchange, at least from that part of the coded sequence of data bits which has not experiences a collision.

Yet another aspect of the invention that achieves some of the objects is a reader/writer for non-contacting interchange of a sequence of data bits with at least one mobile data memory, which has a second coding device that is operable to implement some of the techniques discussed above. The second coding device may in this case load the preloaded time slot with an on value on reception of two successive time slots with an on value.

Still another aspect of the invention that achieves some of the objects is an identification system that is operable to implement some of the techniques discussed above using a modulation method based on the ISO/IEC Standard 14443 or the ISO/IEC Standard 15693 for operation in an ISM frequency band, in particular in an ISM frequency band of 13.56 MHz. The identification system has at least one reader/writer and at least one mobile data memory according to the invention, which can interchange sequences of data bits via a non-contacting data transmission path.

Still another aspect of the invention is a method for coding a sequence of data bits to detect a collision between a first data source and a second data source. The method comprises representing at least one of said data bits from the first data source using a first sequence of time slots, each time slot from said first sequence having an on or off value. A corresponding data bit from the second data source is represented using a second sequence of time slots, each time slot from said second sequence having an on or off value. A predetermined time slot from the first and second sequence of time slots is preloaded with an off value. A logical operation combining the at least one of said data bits from the first data source and the second data source is performed. The collision is detected based on a result of the logical operation and the predetermined time slot is replaced with an on value if the collision is detected.

An advantage of the coding method according to the invention is that the complementary coding of a data bit in a time slot frame allows direct collision identification, when data bits having a logical on/off value which are transmitted simultaneously are received.

A further advantage is that termination of the ongoing data transmission sequence can be achieved within one checking time slot, even within one transmitted coded data bit. Therefore, collision information can be sent to the mobile data memories involved, for rapid resolution of the collision and further transmission of subsequent data.

A further advantage of the method according to the invention is that the weighted coding of a data bit allows correction by the reader/writer, for example in the case of a sporadically missing modulated time slot. This furthermore advantageously makes it possible to improve the safety, security and reliability of the data transmission.

BRIEF DESCRIPTION OF THE DRAWINGS

The invention will be explained in more detail with reference to the following figures, in which:

FIG. 2 shows a detail of an example of a sequence of data bits according to the invention.

FIG. 4 shows an example of an exemplary embodiment of the method according to the invention for carrier-frequency-modulated load modulation.

DESCRIPTION OF THE EMBODIMENTS

Figure 1:
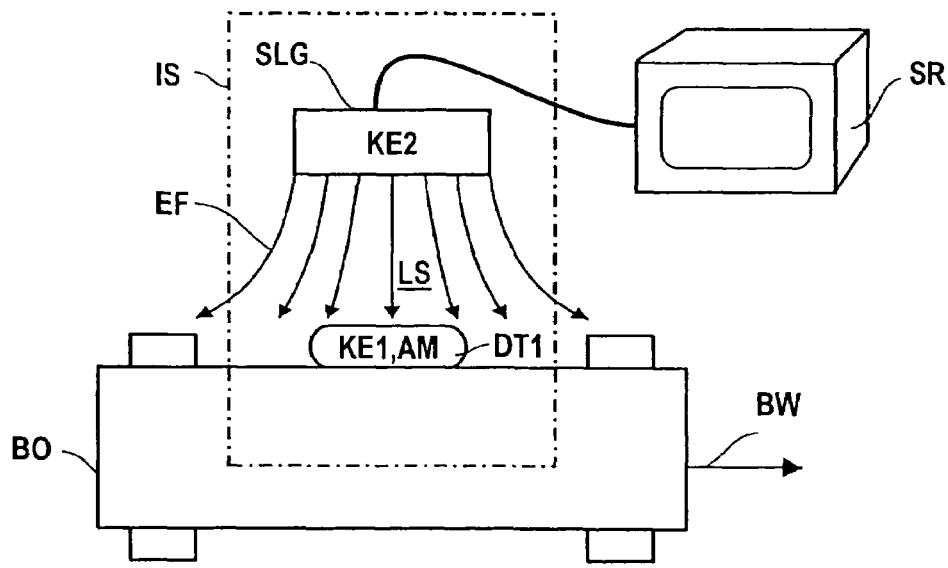
FIG. 1 shows an example of an identification system, which has a reader/writer and a mobile data memory, each having a coding device for carrying out the method according to the invention.

By way of example, FIG. 1 shows an identification system IS which has a reader/writer SLG and a mobile data memory DT1, each having a coding device KE1, KE2. Furthermore, the mobile data memory DT1 has a data checker AM. A sequence of data bits B1-B5 are transmitted through a non-contacting data transmission path LS, for example through an air interface. The upper part of FIG. 1 shows an example of a control computer SR, which is connected to a reader/writer SLG via an interface. The data is interchanged between the control computer SR and the reader/writer SLG via this interface. The interface is used, for example, for data recording.

The lower part of FIG. 1 shows an object BO, for example a vehicle, which is moving in a direction BW relative to the reader/writer SLG. A mobile data memory DT1 is fitted to the moving object BO, on the side. The reader/writer SLG and the data storage medium DT1 are connected through, for example, the air interface LS. Data transmission and energy supply to the data storage medium DT1 takes place through the air interface LS.

The data transmission may be used for identifying the vehicle BO by means of the reader/writer SLG. Another possible use of the data transmission is to transmit, for example, new job data for delivery of a transporting item to the vehicle BO. Energy flow lines EF are also shown, in order to illustrate the energy flow from the reader/writer SLG to the mobile data memory DT1.

FIG. 2 shows details of an example of a sequence of data bits B1-B5 according to the invention. The sequence is in this case preceded by a synchronization sequence SYNC which is required, inter alia, for synchronization between a reader/writer SLG and a mobile data memory DT1-DT3. In one implementation, this synchronization sequence SYNC is defined based on any commonly used standard for the mobile data memories D1-D3 for operation in an identification system IS.

The exemplary data bits B1-B5 are coded such that these bits are organized in a sequence of time slot frames FR1-FR5. The data bits B1-B5 have a logical binary on value 1 or off value 0. The time slot frames FR1-FR5 are subdivided for coding purposes into time slots ZS1-ZS14. These time slots can assume an on value Z1, or an off value Z0. In the example shown in FIG. 2, four time slots ZS11-ZS14 where chosen, by way of example, for one time slot frame from FR1-FR5.

In the example shown FIG. 2, the coding in each time slot frame FR1-FR5 is carried out such that a time slot AF at the location of the time slot ZS14 is preloaded with an off value Z0. The time slots ZS11-ZS13 which are not preloaded can be loaded with on or off values Z1, Z0 so as to form the logical on or off value 1, 0 for each data bit from among B1-B5. In addition, the coding in a time slot frame FR1-FR5 is carried out such that at least one time slot from ZS11-ZS14 with an off value Z0 follows a time slot from ZS11-ZS14 with an on value Z1.

An example of a transmission protocol which is based on the disclosed teachings complies with the requirement to ensure that energy is supplied to a mobile data memory D1-D3 in accordance with the abovementioned ISO IEC Standards. This applies in particular to transmission through an air interface LS by non-contacting inductive means. With respect to the technical implementation of the method, a modulated time slot in this case corresponds to a time slot ZS11-ZS14 with an on value Z1. In the case of a time slot ZS11-ZS14 with an off value Z0, there is no modulation, for example of the carrier wave sued for transmission.

Furthermore, according to the disclosed teachings, the time slots ZS11-ZS13 which are not preloaded by way of example are loaded with on or off values Z1, Z0 such that the loading with a logical on value 1 is complementary to a loading with a logical off value 0. For example, in FIG. 2 a sequence of values of on, off and on represents a logical 1. A sequence of values complementary to this would be off, on and off, representing a logical 0.

The advantage of the coding method according to the invention is that the complementary coding of a data bit B1-B5 in an associated time slot frame FR1-FR5 allows immediate collision identification when a binary on or off value 1 or 0 is received In the present example, when a collision between signals from two data memories occur, a reader/writer SLG would receive three time slots with an on value Z1. This is because of reception superimposition of the transmitted time slots ZS11-ZS13 from the two colliding data memories. This is explained in more detail in the example shown in FIG. 3.

Furthermore, according to the invention, an odd number of time slots ZS11-ZS13 which are not loaded is chosen. In addition, in an example implementation, a greater number of time slots Z11-Z14 are loaded with an on value Z1 for coding of a logical on value 1 than for coding of a logical off value 0. In the example shown in FIG. 2, a coded logical on value 1 has two time slots ZS11, ZS13 with an on value Z1, in comparison to one time slot Z12 with an off value Z0. Likewise, and complementary to this, a coded logical off value 0 has two time slots with an off value Z0 and one time slot with an on value Z1.

This is associated with the further advantage that the weighted coding of a data bit B1-B5 in a time slot frame FR1-FR5 allows correction by the reader/writer. Thus, for example, a sporadically missing modulated time slot ZS11 with a coded logical on value 1 does not have any disadvantageous effect on the overall transmitted data content.

Furthermore, this advantageously allows the safety, security and reliability of the data transmission to be increased.

Figure 3:
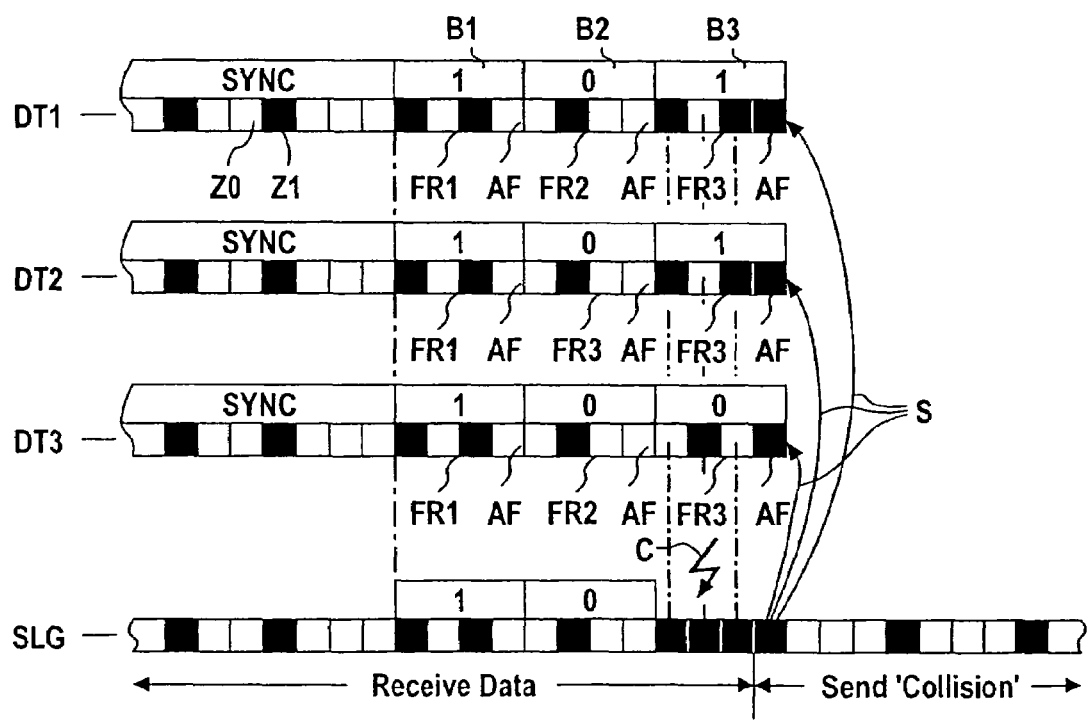
FIG. 3 shows an example which describes a collision event during data transmission from three mobile data memories.

FIG. 3 shows an example of a collision event C when three mobile data memories DT1-DT3 transmit data simultaneously. In this case, the figure shows a detail of a coded sequence of data bits B1-B3 in the time slot frames FR1-FR3 according to the invention. In this example, data memory DT1 and DT2 have a logical on value 1 in FR3. On the other hand, data memory DT3 has a logical off value 0 in FR3. This clearly shows that the time slots ZS11-ZS 13 are loaded differently with an on or off value Z1, Z0 in the time slot frame FR3. Therefore, in FR3, because of the collision between a logical on value 1 and a logical off value 0, a signal sequence of on value, on value and on value is received. Such a sequence is meaningless or illogical, thus providing the reader/writer SLG with a indication of the collision.

In the present example, the second coding device KE2 of the reader/writer SLG shown in FIG. 1 loads the preloaded time slot AF, ZS14 with an on value Z1 on receiving at least two successive time slots ZS11-Z13 that have the same type of on or off value. In the example, the reader/writer SLG receives three modulated time slots ZS11-ZS13 with on values. This is illustrated in the figure by a lightning symbol. Collision information S is now made available to the transmitting mobile data memories DT1-DT3 by loading the preloaded time slot AF with an on value Z1.

According to the invention, the mobile data memories DT1-DT3 have data checkers AM, which terminate the non-contacting interchange of a sequence of data bits B1-B3 on identification of an on value Z1 in a preloaded time slot AF. In the example shown in the figure, this is done by identification of a modulated time slot Z1 at the location of the preloaded time slot AF in the time slot frame F3. In order to check collision information S, the mobile data memories DT1-DT3 change from a transmission mode to a reception mode for a time slot AF which is, for example, short.

According to the invention, the mobile data memories DT1-DT3 can restart the non-contacting interchange, at least from that part of the sequence of data bits B1-B5 which have not experienced a collision, after a termination. On receiving the collision information S, the mobile data memories DT1-DT3 which are involved in the collision can, for example, make use of known collision resolution mechanisms in the first coding device KE1.

These collision resolution mechanisms may, for example, also be stored in the first coding device KE1. It is thus, for example, possible to use the serial number to determine which of the mobile data memories DT1-DT3 involved should be the first to restart the transmission of the sequence of data bits B1-B5.

This is associated with the advantage that the ongoing data transmission sequence can still be terminated within a transmitted coded data bit B1-B5, that is to say within the associated time slot frame FR1-FR5. It is thus advantageously possible, immediately after termination, to send collision information S to the mobile data memories DT1-DT3 involved in the collision in order to rapidly resolve the collision S and continue with the data B1-B5 which has not yet been transmitted.

FIG. 4 shows an exemplary embodiment of the method according to the invention for carrier-frequency-modulated load modulation. In this case, a time slot ZS11-ZS14 with an on value Z1 is formed by a pulse sequence PF for modulation. In the example shown in FIG. 4, these are the time slots ZS11 and ZS13 in the time slot frame FR1. The pulse sequence PF may have an even number of pulses PL and pauses PS with the same duty ratio, as is illustrated by way of example in FIG. 4. In this context duty ratio, for example, could be established as a ratio of the width of a single pulse to the width of a single pause.

Furthermore, according to the invention, a number, which can be predetermined, of carrier oscillations fo can be associated with each pulse PL. The number 8 was chosen in the example shown in FIG. 4.

This is associated with the advantage that the Type B modulation methods, which are standardized in the above-mentioned ISO IEC Standards, can also be used by masking out the carrier frequency fo in the pauses PS.

According to the invention, the identification system IS can be operated with the reader/writer SLG and with at least one mobile data memory DT1-DT3 in order to carry out the method according to the invention using a modulation method based on the ISO/IEC 14443 Standard or the ISO/IEC 15693 Standard in an ISM frequency band, in particular in an ISM frequency band of 13.56 MHz, for non-contacting data transmission on inductively coupled paths.

The above description of the embodiments have given by provided by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is

1. A method for coding a sequence of data bits, at least one of said bits having a logical on value or a logical off value, said data bits being organized in a sequence of time slot frames, at least one of the time slot frames having a plurality of time slots, each of said plurality of times slots capable of having an on value or an off value, said coding comprising:
   a) preloading a time slot from the plurality of time slots with the off value, and
   b) loading each of the time slots other than the preloaded time slot with the on value or the off value to form the logical on value or the logical off value for the at least one of said data bits,
   wherein a time slot with the off value from the plurality of time slots always follows another time slot with the on value from the plurality of time slots, and
   wherein the logical on value is complementary to the logical off value.

2. The method of claim 1, wherein the preloaded time slot is arranged at a start of the at least one time slot frame.

3. The method of claim 1, wherein the preloaded time slot is arranged at an end of the at least one time slot frame.

4. The method of claim 1, wherein the at least one time slot frame has an odd number of time slots which are not preloaded.

5. The method of claim 4, wherein the logical on value is represented by a greater number of time slots being loaded with the on value than for representing the logical off value.

6. The method of claim 1, wherein the time slot with the on value is formed by a pulse sequence comprised of pulses and pauses.

7. The method as claimed in claim 6, wherein the pulse sequence includes an even number of pulses and pauses with a same duty ratio.

8. The method as claimed in claim 7, wherein a predetermined number of carrier oscillations are associated with one pulse.

9. A mobile data memory for non-contacting interchange of a sequence of data bits with a reader/writer, said data memory comprising:
   a first coding device;
   a sequence of data bits, the first coding device operable to assist in coding the sequence of data bits, at least one of said data bits having a logical on value or a logical off value, said at least one of said data bits being organized in a sequence of time slot frames, at least one of the time slot frames having a plurality of time slots,
   wherein each of said plurality of times slots is capable of having an on value or an off value, said at least one time slot frame further including:
      at least one time slot preloaded with the off value to form a preloaded time slot,
      at least one time slot with the off value following a time slot with the on value, and
      each of the time slots other than the preloaded time slot loaded with the on value or the off value to form the logical on value or the logical off value for the at least one of said data bits,
   wherein the logical on value is complementary to the logical off value.

10. The mobile data memory of claim 9, further comprising:
   a data checker operable to terminate the non-contacting interchange of the sequence of data bits on identification of the on value in the preloaded time slot.

11. The mobile data memory of claim 9 operable to restart the non-contacting interchange after the termination at least from that part of the sequence of data bits which has not experienced collision.

12. A reader/writer for non-contacting interchange of a sequence of data bits with at least one mobile data memory comprising:
   a second coding device operable to assist in coding the sequence of data bits, at least one of said data bits having a logical on value or a logical off value, said at least one of said data bits being organized in a sequence of time slot frames, at least one of the time slot frames having a plurality of time slots, each of said plurality of times slots capable of having an on value or an off value;
   wherein the second coding device is operable to assist in preloading at least one predetermined time slot with the off value to form a preloaded time slot, and
   at least one time slot with the off value always follows a time slot with the on value, and
   each of the time slots other than the preloaded time slot are loaded with the on value or the off value to form the logical on value or the logical off value for the at least one of said data bits,
   wherein the logical on value is complementary to the logical off value.

13. The reader/writer as claimed in claim 12, wherein the second coding device is operable to load the preloaded time slot with the on value on reception of two successive time slots with the on value.

14. An identification system comprising:
   a mobile data memory for non-contacting interchange of a sequence of data bits with a reader/writer, said data memory having a first coding device and a sequence of data bits;
   a reader/writer having a second coding device;
   the first coding device and the second coding device operable to assist in coding the sequence of data bits, at least one of said data bits having a logical on value or a logical off value, said sequence of data bits being organized in a sequence of time slot frames, at least one of the time slot frames having a plurality of time slots, each of said plurality of times slots capable of having an on value or an off value, said sequence of data bits further including:
      at least one time slot preloaded with the off value to form a preloaded time slot,
      at least one time slot with the off value always following a time slot with the on value, and each of the time slots other than the preloaded time slot loaded with the on value or the off value to form the logical on value or the logical off value for the at least one of said data bits, wherein the logical on value is complementary to the logical off value.

15. The identification system of claim 14, wherein a modulation method based on the ISO/TEC Standard 14443 is used.

16. The identification system (IS) of claim 15, wherein a modulation method based on the ISO/JEC Standard 15693 for operation in an ISM frequency band.

17. The identification system (IS) of claim 15 being operable in an ISM frequency band of 13.56 MHz.

18. The identification system (IS) of claim 16 being operable in an ISM frequency band of 13.56 MHz.

19. The identification system of claim 14 wherein the interchange of sequences of data occur through a non-contacting data transmission path.

20. A method for coding a sequence of data bits to detect a collision between a first data source and a second data source, said method comprising:

representing at least one of said data bits from the first data source using a first sequence of time slots, each time slot from said first sequence of time slots having an on value or an off value; and representing a corresponding data bit from the second data source using a second sequence of time slots, each time slot from said second sequence of time slots having the on value or the off value;

preloading a predetermined time slot from the first and second sequence of time slots with the off value;

performing a logical operation combining the at least one of said data bits from the first data source and the second data source;

detecting the collision based on a result of the logical operation, and replacing the predetermined time slot with the on value if the collision is detected.

21. The method of claim 20, wherein a logical on value represented by the sequence of time slots is complementary to a representation for the logical off value.

22. The method of claim 20, wherein the collision is detected when the result does not correspond to the on value or the off value.

23. The method of claim 21, wherein the logical on value and the logical off value are represented by at least two adjacent time slots with complimentary values in the adjacent time slots.

* * * * *